April 26, 1938.   J. M. PESTARINI   2,115,536
CONSTANT CURRENT MOTOR SYSTEM
Filed Dec. 29, 1934   2 Sheets-Sheet 1

INVENTOR.

Patented Apr. 26, 1938

2,115,536

UNITED STATES PATENT OFFICE 2,115,536

CONSTANT CURRENT MOTOR SYSTEM

Joseph Maximus Pestarini, Grant City, Staten Island, N. Y.

Application December 29, 1934, Serial No. 759,662
In France January 22, 1934

6 Claims. (Cl. 172—239)

This invention relates to rotating electrical machines which are connected in series with one another and which are supplied from a source which delivers a current of substantially constant strength. The complete chain of all these machines forms a series network.

The current that traverses the armature of these machines is thus of a substantially constant strength, and the source supplying the energy will supply such a voltage in one direction or in the other, as required by the consumers, which may operate as motors or as generators. The arrangement into a series network has many advantages: Very simple switch gear; elimination of the danger due to short-circuit; easy transition from motoring to regenerating and vice versa; easy operation at a high speed and at a very low speed as well; easy reversal of the direction of rotation; stalling of the motors without trouble.

However, this arrangement is not immediately suitable for supplying motors which must rotate at an adjustable constant speed with a torque varying between wide limits.

The present invention discloses arrangements allowing motors inserted in a series network to operate at an adjustable constant speed with very variable torque.

The invention consists essentially in supplying the field of the motor which must operate at an adjustable constant speed, with a current which varies automatically and quickly in such a way as to maintain the motor torque at the right value when the load torque varies, the motor torque varying very much for a slight discrepancy from the desired speed, and the above mentioned field current being essentially due to the difference between two electromotive forces, one of which varies with the speed of the motor and the other being adjustable at any desired value.

Fig. 1 of the drawings is the scheme of a known arrangement;

Figure 1:
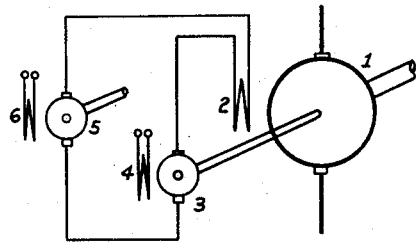

Many alternatives will be hereinafter described in detail. Fig. 1 gives the scheme of a first alternative. The main motor is indicated by 1, and its field winding by 2; the armature of the main motor is supposed to be inserted in the series network schematically shown on the figure by thick lines; the field is differentially excited by two antagonistic electromotive forces one of which, let it be Y, is induced by the dynamo 3 mounted on the same shaft as the main motor 1, and the other, let it be Z, is induced by the dynamo 5 separately driven. The electromotive force Y varies with the speed of the main motor 1, and the electromotive force Z may be adjusted to any desired value by adjusting its field 6 or its speed.

When the main motor 1 runs at the desired speed, let it be N, the electromotive forces Y and Z balance one another exactly, the fields 4 and 6 having been adjusted for this condition; when the speed of the main motor 1 shows a discrepancy, "delta N" from the speed N, the electromotive forces Y and Z do not balance any more and their difference creates a large current which traverses the field 2 of the main motor in such a direction as to develop the correct torque necessary to keep the speed very near to N with but a small discrepancy $dN$. When the sign of "delta N" changes the direction of the current traversing 2 is reversed accordingly. By varying the value and direction of the electromotive force Z, we shall vary accordingly the value and the sign of N, the desired speed of the main motor 1.

This scheme is satisfactory for some kinds of applications where the speed discrepancies allowed are rather large. In fact, the voltage to be supplied to the field winding 2 of the main motor 1 is the difference of the voltages induced in the armatures of the dynamo machines 3 and 5, and therefore when the field 2 must be fully energized the speed of the main motor 1 must show a rather large discrepancy from the no load speed value.

When a very close speed regulation is required, that is, when the speed discrepancy due to load must be very small, then the scheme of Fig. 1 is unable to solve practically the problem. In this case the solution is given by the schemes drawn according to the present invention, and essentially consisting in the use of an auxiliary generator of direct current of substantially constant intensity supplying with current the field of the main motor; the value of the substantially constant intensity of the said auxiliary generator is controlled by the total ampere-turns of a field winding, which may be called "variator" for the sake of simplicity; a slight speed discrepancy of the main motor is made to cause a slight discrepancy of the ampere-turns of the variator of the auxiliary generator and the latter supplies with current the field of the main motor amplifying this variation to a large rate, for instance more than ten times.

Figure 2:
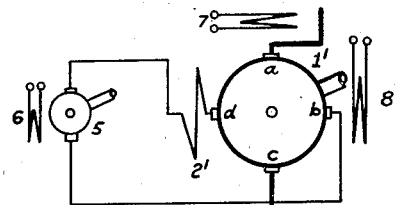
Fig. 2 is a modification of the scheme of Fig. 1, involving the use of a metadyne as main motor.

Fig. 2 shows another scheme arranged according to the present invention where a metadyne is used as main motor 1'. The metadyne is an electrical rotating machine mentioned in many previous American patents for instance in Patents No. 1,945,447; No. 1,962,030; consisting essentially of a rotor with winding and commutator as in a dynamo machine; a stator is provided which mainly affords a return path of low magnetic reluctance for the fluxes which are set up by the rotor currents, but which also may carry some windings which will endow the machine with desired characteristics. Generally the commutator carries two sets of brushes and the current traversing one set of brushes creates by its rotor ampere turns a flux which induces an electromotive force between the brushes of the other set. One set of brushes, called primary set and traversed by a current called primary current, is generally connected to a supplying source of direct current while the other set of brushes, called secondary set, are traversed by a current called secondary current and supply their current to the consumers, either machines or field windings.

A description in detail of the metadyne principles is given in a paper entitled "Esquisse sur la Metadyne" by J. M. Pestarini in the "Bulletin Scientifique A. I. M." No. 4, April 1931 of "l'Association des Ingenieurs Electriciens" published by the "Institute Electrotechnique Montefiore" Liege, Belgium.

The metadyne 1', in Figure 2, is inserted into the series network through its primary brushes $a$ and $c$. At its secondary brushes $b$ and $d$ an electromotive force, let it be Y, is induced by the flux created by the primary rotor ampere-turns, which is proportional to the speed of the metadyne motor, and which is opposed to the electromotive force Z of the separately driven dynamo 5. The current due to the difference between Z and Y traverses the field 2' of the metadyne motor 1' and thus adjusts the torque. The stator field 7 on the metadyne, having its magnetic axis in the direction of the primary current commutation axis, called primary variator winding, may be used for modifying the primary flux that induces the secondary electromotive force Y, and thus for modifying the desired value of the constant speed.

The stator field 8 in the metadyne, having its magnetic axis in the direction of the secondary current commutation axis, called secondary variator winding, may be used for modifying the mean value of the current traversing the field 2'; if the latter is thus made very small the speed regulation will be more accurate.

The two schemes shown in Fig. 1 and Fig. 2 are derived from one another substituting the metadyne motor 1' of Figure 2 for the two dynamos 1 and 3 of Figure 1, and vice versa. It is now easy for one versed in the art to make a similar transition for many of the schemes hereunder described.

Figure 3:
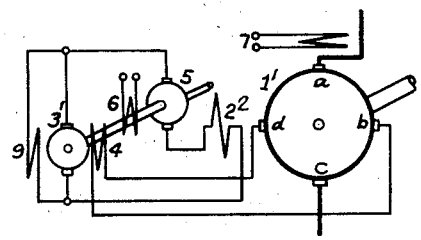
Figs. 3 and 5 are schemes similar to Fig. 2 with variations in the regulating means for the metadyne used as a main motor.

Fig. 3 gives another scheme arranged according to the present invention. The main motor 1' is again a metadyne motor inserted by its primary brushes $a$ and $c$ into the series network. The secondary brushes $b$ and $d$ supply a field winding 4 of a dynamo 3' driven independently at a substantially constant speed; the electromotive force, say Y, induced in the dynamo 3' varies with the speed of the main motor 1' and it opposes the electromotive force, say Z, of the dynamo 5 separately excited by the field winding 6. The current that results from the antagonism of the electromotive forces Y and Z, traverses the field 2² of the main motor 1' and it adjusts its torque so as to maintain the speed N of the main motor 1 practically constant. The value of N may be varied by modifying the excitation 6 of the dynamo 5 or the ampere turns of the primary variator winding 7, or both simultaneously.

The shunt winding 9 on the dynamo 3' may be used to amplify the variations $dY$ of the electromotive force Y for a given discrepancy $dN$ of the speed N of the main motor 1. The use of such a shunt winding in all other schemes here described, on the element that induces the electromotive force that varies with the speed N of the main motor will always result in a larger ratio of $$\frac{dY}{dN}$$

and therefore in a finer speed adjustment.

Figure 4:
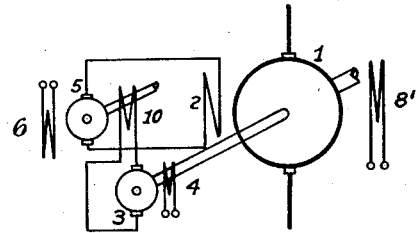
Figs. 4, 6, 7, 8, 9 and 10 are schemes similar to that shown in Fig. 1 with variations in the control of the main motor.

Fig. 4 gives the scheme of another alternative arrangement according to the present invention. The dynamo 3 driven by the same shaft as the main motor 1, supplies with current a field winding 10 of a separately driven dynamo 5 and creates thus between the brushes of the latter an electromotive force, say Y, which opposes another electromotive force, say Z, induced between the same brushes by an adjustable amount of ampere turns in the field winding 6. The difference Z—Y between these two electromotive forces creates a current in the field coil 2 of the main motor that will adjust the torque to its right value. The auxiliary field coil 8' on the main motor may be used for reducing the mean value of the ampere turns in 2 and thus improving the speed regulation.

Figure 5:
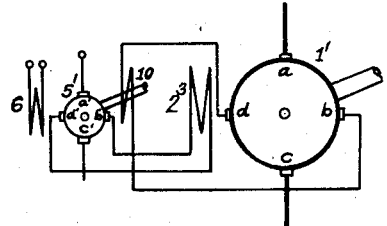

Fig. 5 gives a scheme derived from the scheme of Fig. 4 by using a main metadyne motor 1' instead of the main motor 1 and the auxiliary dynamo 3 of Fig. 4, and by using an auxiliary metadyne 5' instead of the auxiliary dynamo 5 of Fig. 4. The antagonistic coils 10 and 6 act now as secondary variator windings of the auxiliary metadyne 5', and the secondary current of the auxiliary metadyne traverses the field coil 2³ of the main metadyne motor 1' and adjusts its torque.

Figure 6:
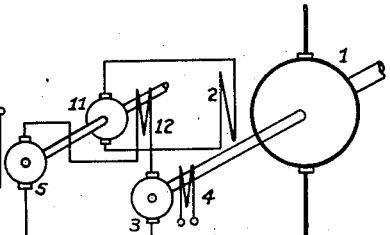

Fig. 6 gives a scheme showing an improvement of the scheme of Fig. 1. The current resulting from the antagonism of the electromotive forces Y of dynamo 3 and Z of dynamo 5 does not traverse the field winding 2 of the main motor 1 but traverses the field winding 12 of an auxiliary dynamo 11 separately driven and the latter, in its turn, feeds the field coils 2 of the main motor 1. Thus the speed regulation is more precise.

Figure 7:
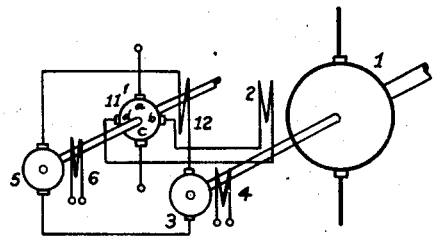

Fig. 7 gives an alternative of the scheme of Fig. 6, the auxiliary metadyne 11' of Fig. 7 having been substituted for the auxiliary dynamo 11 of Fig. 6.

In Fig. 7 the main motor 1 drives a dynamo machine 3 which opposes its electromotive force to the electromotive force induced by the dynamo machine 5 supposed to be driven at constant speed by some suitable means. The speed discrepancy creates a voltage discrepancy between the two dynamos 3 and 5 and creates thus a current which instead of being supplied directly to the field winding 2 of the main motor 1 as formerly done in the scheme of Fig. 1, is supplied to the variator 12 of the auxiliary generator 11' of spontaneously variable voltage. The latter finally supplies with current the field winding 2 of the main motor 1 developing a power which is generally twenty and even more times greater than the power supplied to the variator 12 of the auxiliary generator 11'. Thus even for a very slight speed discrepancy from the desired speed value of the main motor 1, a very strong energization of the field 2 of the main motor 1 is obtained.

The auxiliary generator 11' of spontaneously variable voltage represented by Fig. 7 is of the metadyne type.

Figure 8:
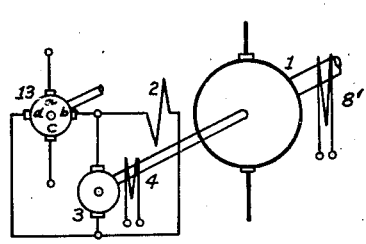

Fig. 8 gives the scheme of another alternative arrangement according to the present invention. An auxiliary metadyne 13 supplies with its secondary current a field winding 2 of the main motor 1, and, in parallel with it, the armature of an auxiliary dynamo 3 driven by the same shaft as the main motor 1. Thus the secondary current of constant intensity of the auxiliary metadyne is distributed between the coil 2 and the dynamo 3. The main motor 1, is provided with another field coil 8' separately excited at a substantially constant value. In order to obtain a zero torque the ampere turns of 2, created by a current, say $I_0$, must therefore neutralize the ampere turns of 8'.

If, now, the speed changes and if, for instance, we assume that it increases, the current traversing 2 will increase to a greater extent and, if the connections are properly made it will create a large braking torque. The reverse happens when the speed decreases slightly. The strength of the field 4 and of the field 8' will determine the operating speed. This scheme is particularly adapted when many motors have to be controlled simultaneously because a single auxiliary metadyne will suffice for the control of all the motors. The change of the value $I_0$ by changing the amount of ampere turns of 8 provides a means for changing at will the operating constant speed.

Figure 9:
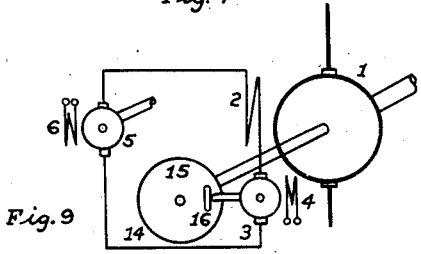

Fig. 9 illustrates an improvement which may be applied upon many of the above described schemes. The scheme of Fig. 9 is derived from the scheme of Fig. 1, but the auxiliary dynamo 3, the voltage of which is sensitive to the speed of the main motor 1, is coupled to the shaft of the main motor by some mechanical coupling 14 with variable gear ratio so that when the speed of the main motor 1 is very low, the speed of the auxiliary dynamo 3 may still be high enough as to obtain precise speed regulation. The mechanical coupling illustrated schematically on Fig. 9, as an instance, consists of a disc 15 driven by the shaft of the main motor 1, geared with a friction wheel 16 driving the auxiliary dynamo 3. The distance of the friction wheel 16 from the center of the disc 15, defines the ratio of the angular speed of the coupled shafts.

Figure 10:
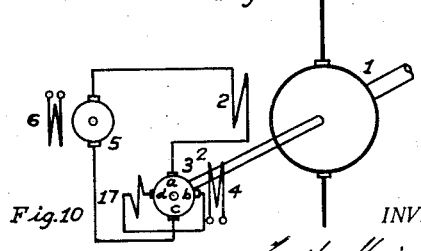

Fig. 10 illustrates another improvement which may be applied to many of the above described schemes. The scheme of Fig. 10 is derived from the scheme of Fig. 1 where the auxiliary dynamo 3 of Fig. 1 is replaced by the auxiliary metadyne $13^2$ of Fig. 10. The secondary brushes $b$, and $d$ of $13^2$ of the latter supply a stator field 17 of the metadyne which has the effect of compounding the voltage induced between the primary brushes $a$ and $c$. Thus the speed regulation will be finer because of the ohmic drop in the circuit of the field 2 being compensated by the compounding effect of the field 17.

Figure 11:
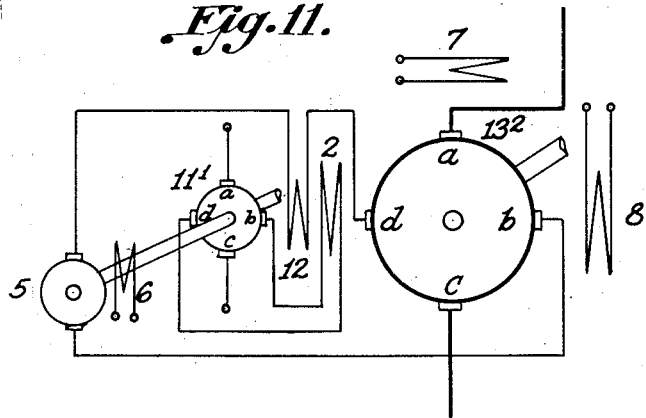
Fig. 11 is a scheme similar to that of Fig. 7 with a metadyne as the main motor.

The scheme of Fig. 11 is derived from the scheme of Fig. 7 by substituting metadyne $13^2$ as main motor for the dynamo machine 1 of the scheme of Fig. 7. The small dynamo 5 driven by some means at a constant speed creates an E. M. F. of definite value by the control of its field winding 6, this E. M. F. being opposed to the E. M. F. induced between the secondary brushes $b$ and $d$ of the main metadyne motor $13^2$. The current due to the unbalance of these two opposed E. M. F.'s traverses the variator winding 12 of the auxiliary generator 11' which is represented in Fig. 11 as a metadyne, in its turn the metadyne 11' supplies with its secondary brushes $b$ and $d$ the field 2 of the main motor $13^2$ with current developing a power 20 times or more the power developed in the variator 12. Thus for a slight discrepancy of the speed from the desired value a large amount of energization of the field of the main motor is obtained.

Figure 12:
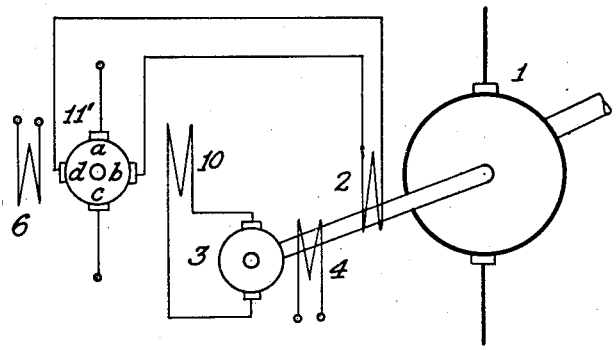
Fig. 12 is a scheme similar to that of Fig. 5 except that for the metadyne of Fig. 5 a simple motor and exciter driven thereby is substituted.

Fig. 12 is an alternative scheme embodying the present invention. Fig. 12 is similar to Fig. 5. The main motor 1 drives a pilot small dynamo 3 with a field winding 4 regulated at will at some constant value of ampere-turns.

The auxiliary metadyne 11' which feeds by its secondary brushes $b$ and $d$ the field winding 2 of the main motor 1 is provided with a variator having two members, one member 10 directly fed by the pilot dynamo 3 and another member 6 regulated at any desired constant value. The current supplied by the metadyne 11' to the field winding 2 is controlled by the algebraic sum of the ampere-turns created by the two members 6 and 10; for a slight speed variation of the main motor 1 there will be a slight variation of the ampere-turns in the member 10 of the variator of the metadyne 11' and the latter in its turn will give a large variation of energization of the field winding 2, developing thus a large torque in the motor 1 which tends to keep the speed of the motor 1 constant.

All the above described schemes may be used in a direct current parallel network where all the consumers are connected in parallel with the source and with one another, but where the voltage at the bus bars is very variable.

Many modifications of the windings of the machines here above described, or other alterations may be conceived by a man versed in the art, yet remaining within the scope of the present invention.

Having now particularly described and ascertained the nature of my invention and in what manner the same is to be performed, I declare that what I claim is:

1. A motor adapted for insertion in the circuit of an electrical network of machines connected in series relation and fed by a constant current of variable voltage, in combination with an auxiliary generator of the kind called metadyne and having a stator winding, for supplying the field of the motor with current substantially proportional to the ampere turns of the stator winding of the metadyne; and means for causing the ampere turns of the stator winding to vary quickly when the speed of the motor shows a discrepancy from the desired value.

2. In a motor adapted for insertion in the circuit of an electrical network of machines connected in series relation and fed by a constant current of variable voltage, in combination with an auxiliary generator of the metadyne type for supplying a current to the motor field substantially proportional to the ampere turns of a field of the metadyne, the current traversing the field of the metadyne being due to the difference between two opposed E. M. F.'s, one E. M. F. being kept constant at a desired value and the other E. M. F. being proportional to the speed of the motor thus causing the ampere turns of the metadyne field to vary quickly with changes in speed of the motor.

3. In a motor adapted for insertion in the circuit of an electrical network of machines connected in series relation and fed by a constant current of variable voltage, in combination with an auxiliary generator of the metadyne type for supplying a current to the motor field substantially proportional to the ampere turns of a field of the metadyne, the current producing the ampere turns of the field of the metadyne being the algebraic sum of the ampere turns of two members, one member having a constant number of ampere turns at any desired value and the other member having ampere turns created by a current due to an E. M. F. proportional to the speed of the motor so that the ampere turns of the field of the metadyne will be caused to vary quickly when the speed of the motor shows a discrepancy from the desired value.

4. A motor adapted for insertion in the circuit of an electrical network of machines connected in series relation and fed by a constant current of variable voltage, in combination with an auxiliary generator of the metadyne type for supplying a current to the motor field substantially proportional to the ampere turns of a field of the metadyne, the current producing the ampere turns of the field of the metadyne being the algebraic sum of the ampere turns of two members, one member having a constant number of ampere turns of any desired value and the other member having ampere turns created by a current supplied by two auxiliary brushes on the commutator of the motor between which is induced an E. M. F. proportional to the speed of the motor, thus causing the total ampere turns of the field of the metadyne to vary quickly when the speed of the motor varies from a desired value.

5. A motor adapted for insertion in the circuit of an electrical network of machines connected in series relation and fed by a constant current of variable voltage, in combination with an auxiliary generator of the metadyne type for supplying a current to the motor field substantially proportional to the ampere turns of a field of the metadyne, the current traversing the field of the metadyne being due to the difference between two opposed E. M. F.'s, one E. M. F. being kept constant at a desired value, and the other E. M. F. being supplied by two auxiliary brushes on the commutator of the motor between which an E. M. F. is induced proportional to the speed of the motor thus causing the ampere turns of the field of the metadyne to vary quickly when the speed of the motor varies from the desired value.

6. A motor adapted for insertion in the circuit of an electrical network of machines connected in series relation and fed by a constant current of variable voltage, in combination with an auxiliary metadyne generator for supplying the excitation of the motor in proportion to the ampere turns of the metadyne, the metadyne generator having its secondary brushes connected to supply the field of the motor and its primary brushes fed by current of constant voltage, and means responsive to changes in speed of the motor and supplying exciting current to the metadyne for causing the ampere turns of the metadyne to vary quickly when the speed of the motor shows a discrepancy from the desired motor speed.

JOSEPH MAXIMUS PESTARINI.